April 5, 1960      D. BANDEL      2,931,320

DOUGH MIXER

Filed April 16, 1954      2 Sheets-Sheet 1

INVENTOR
DAVID BANDEL
BY
*Bradley Cohn*
ATTORNEY

April 5, 1960     D. BANDEL     2,931,320
DOUGH MIXER

Filed April 16, 1954     2 Sheets-Sheet 2

INVENTOR
DAVID BANDEL
BY
ATTORNEY

United States Patent Office 2,931,320
Patented Apr. 5, 1960

2,931,320

DOUGH MIXER

David Bandel, Stamford, Conn., assignor to American Machine & Foundry Company, a corporation of New Jersey Application April 16, 1954, Serial No. 423,596

18 Claims. (Cl. 107—40)

My invention relates to the rapid development of doughs, particularly bread doughs. It also relates to a method and a means that may be adapted to continuous production of dough. As is well known to those skilled in the art, the development of dough is presently a batch process. The time required for dough development is too great with conventionally designed dough mixers for practical adaptation to continuous processing.

Because of the great length of time consumed in the methods used heretofore, certain alternative methods have been devised, such as the no-time dough method. The no-time dough method eliminates fermentation time requirements and decreases the time for making bread by the elimination of the fermentation period, i.e. by 2½ to 4 hours. The no-time dough method is not completely satisfactory because it requires an excessive quantity of yeast, thereby increasing the expense, and also giving rise to an undesirable yeasty flavor.

It is an object of my invention to develop at a rapid rate dough suitable for panning.

It is a further object of my invention to devise an apparatus that may be adapted to a batch process as well as a continuous process.

It is also an object of my invention to devise a dough developer that will develop dough on a commercial scale with heretofore unheard of rapidity. For example, I have developed dough batchwise in an apparatus constructed according to my invention in less than one minute. This permits construction of a relatively small apparatus having high throughput capacity.

It is still another object of my invention to devise an apparatus that will produce a finer textured and more uniform bread.

The novel features which I believe to be characteristic of my invention are set forth with particularlity in the appended claims. My invention itself, however, both as to its organization and method of operation may be understood by reference to the apparatus embodying my invention and shown in the accompanying drawings, in which:

Figure 1:
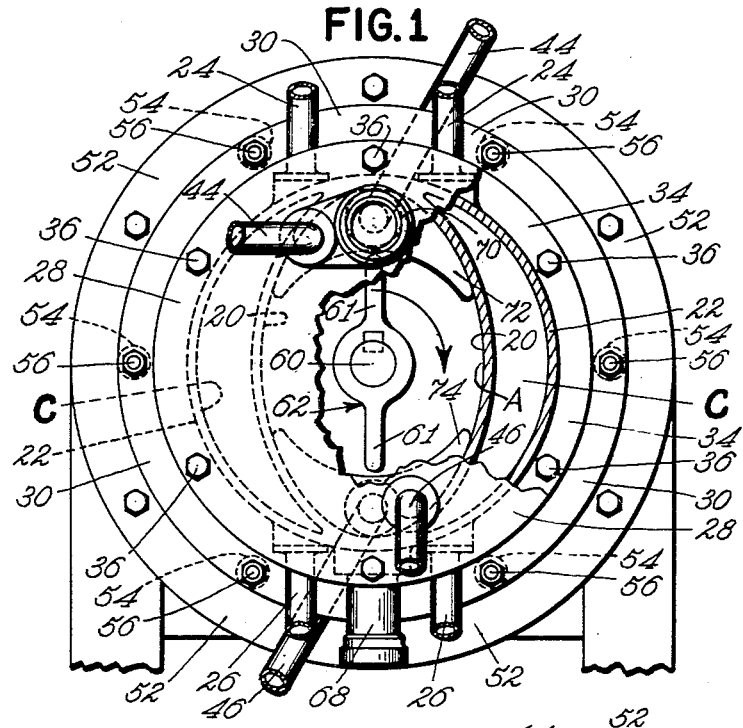
Fig. 1 is an end elevation, partly in section, of a horizontal elliptical chamber provided with a centrally mounted two-bladed paddle the diameter of which is substantially equal to that of the minor axis of the ellipse.
Figure 2:
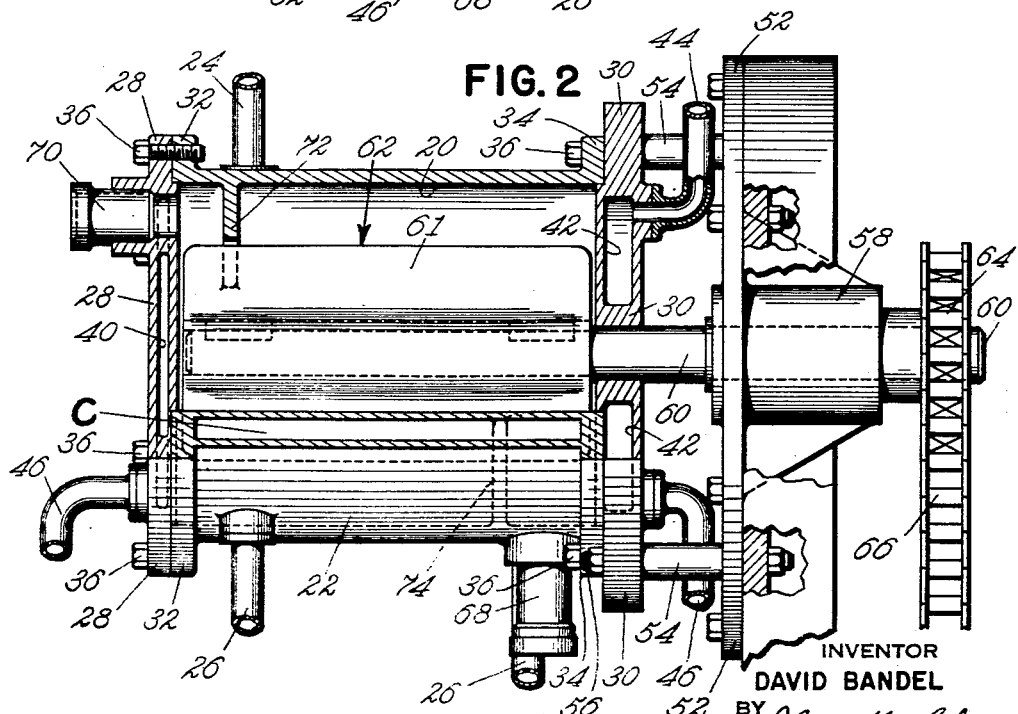
Fig. 2 is a sectional side elevation of the same.

With reference to the drawings, the horizontal chamber 20 shown in Figs. 1 and 2 is an integral part of a round cylinder 22. As seen in Fig. 1, chamber 20 has an elliptical cross-section transverse to the longitudinal axis of the device and thus transverse to the axis of rotation of dough working element 62 hereinafter described. The structure provides the sickle-shaped or semi-lunar cooling chambers C between the walls of the elliptical chamber 20 and the adjacent walls of cylinder 22. Cooling agents may be pumped through each of the cooling chambers C by means of inlet and outlet ducts 24 and 26. The elliptical chamber 20 and the round cylinder 22 have common front and rear end plates 28 and 30, respectively. These plates are secured by an airtight seal to the circular front and rear flanges 32 and 34, respectively, of the cylindrical body 22 by means of bolts 36. Front and rear plates 28 and 30 have cooling chambers 40 and 42, respectively. The inlet and outlet ducts 44 and 46, respectivley, are provided on each plate to receive and discharge the coolant. The entire assemblage is secured in spaced relation from frame structure 52 by means of bolts 56 in plate 30 and spacers 54.

Frame structure 52 has a bearing 58 supporting cantilever shaft 60. Shaft 60 passes through rear plate 30 into the closed elliptical chamber 20. Conventional packing (not shown) around the shaft seals the chamber 20. A paddle or rotor 62 is mounted on shaft 60 within elliptical chamber 20. The rotor or paddle 62 illustrated in Figs. 1 and 2 has two opposed wings or blades 61 each terminating in a transversely rounded outer edge, as shown. The overall width or diameter of rotor 62 is substantially equal to the minor axis of elliptical chamber 20. The free end of the shaft 60 carries a sprocket 64 (Fig. 2) which by means of chain 66 is driven from any suitable source of power (not shown). In operation, paddle 62 is constantly rotated while pre-mixed dough is pumped under pressure through an intake duct 68 into the closed elliptical chamber 20. Thus, the paddle is rotated while chamber 20 is completely full of dough mix. The fully developed dough discharges from an outlet duct 70. Crescent shaped baffle plates 74 and 72 are positioned near the inlet and outlet ducts, respectively. The plates deflect the dough to prevent by-passing.

Paddle 62 is centrally mounted in elliptical chamber 20, that is, the shaft 60 is located at the center of the minor axis of the ellipse of the cross-section of the chamber. By reference to Fig. 1, it may be noted that each edge or tip of the paddle travels toward the side walls of elliptical chamber 20 and away from the top and bottom portions adjacent its major axis. It may be noted that this same relative movement of the rotor blade toward and away from the walls of the container is common to all the structures shown in Figs. 3, 4 and 5.

Figure 3:
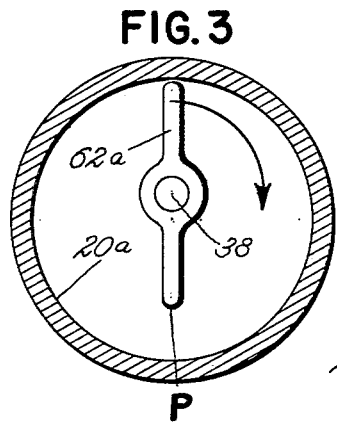
Fig. 3 illustrates a sectional end of a horizontal cylindrical chamber provided with an eccentrically mounted two-bladed rotor or paddle whose edges during rotation traverse a path that approaches within close clearance of the inner wall of the chamber and then draws away from it.
Figure 4:
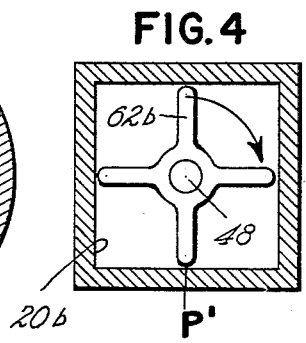
Fig. 4 is a sectional end elevation of a horizontal square chamber provided with a centrally mounted four-bladed paddle or rotor.

In Fig. 3 the chamber 20a is circular in cross section and the paddle 62a is mounted on shaft 38 eccentric to the axis of circular chamber 20a. Any given point p on the paddle will travel toward and away from the wall 20a. In Fig. 4 the paddle 62b is mounted on the shaft 48 concentric to the square chamber 20b. Any point p' on the paddle 62b will likewise travel toward and away from the square wall 20b. It is also evident from paddle 62c of Fig. 5 that any point p" on the paddle 62c will travel toward and away from the triangular wall 20c.

In operation, a prefermented yeast brew, containing yeast, yeast foods, water, salt, sugar and milk solids is incorporated with flour, shortening and dough oxidizer or conditioner. These ingredients are blended into a raw dough pre-mix. The pre-mix is pumped continuously under pressure through duct 68 into chamber 20. It is preferable for best results that chamber 20 be filled substantially full. Iinitially this is done by venting the chamber through duct 70 or through other conventional means in the event duct 70 is located elsewhere than at the top as shown. When the chamber 20 is filled duct 70 is throttled to create a back pressure within chamber 20. The rotor 62 is then rotated at a speed governed by the throughput rate.

I have operated at pressures from 0 to 100 p.s.i.g., although I prefer to operate within the range of 10 to 60 p.s.i.g. However, I wish to state that pressure is not essential in the development of dough, but is used to obtain desirable uniform flow of dough which in turn gives uniform dough development and minimizes cavitation behind the trailing surfaces of the rotor.

The speed of the rotor is adjusted from time to time to maintain a given energy input per unit weight of dough. For example, in a developer such as illustrated in Fig. 1 having a major axis of 20 inches and a minor axis of 13 inches and an internal length of 24 inches (vol. approximately 2.84 cu. ft.) and at an energy input of 0.4 H.P./min. per sound of dough at a throughput rate of 3000 lbs. of dough per hr., the rotor speed will vary between 70 and 80 r.p.m. At a throughput rate of 4500 lbs. per hr., other conditions remaining constant, rotor speed will vary between 90 and 100 r.p.m. The average residence time of dough in chamber 20 will vary both with different flours and with different formulations as well as with different rotor types and rotor speeds.

The discharged dough emerging from duct 70 may be divided, panned, proofed and baked without any additional fermentation time. Breads of exceedingly fine grain and texture have been made in this manner.

The texture and grain of the bread can be varied by the simple expedient of controlling the velocity of the rotor. Finer bubble subdivision in the dough, which determines ultimate texture and grain of the bread, is obtained at higher rotor velocities for a given energy input.

Thus, with a developer constructed according to my invention and with a particular formulation and operating at 0.4 H.P./min. per lb. of dough (throughput 4500 lbs. per hr.), I was able to make bread of a very fine texture at a rotor speed of 100 r.p.m. Reducing the throughput rate to 3000 lbs. per hr. and the rotor r.p.m. to 80, thereby maintaining a constant 0.4 H.P./min. per lb. of dough, I was able to produce bread of a coarser texture. This would also indicate that by constructing a shorter developer than the one indicated in Fig. 2, breads of fine texture can be obtained at lower capacities. This would be true because it would permit a higher rotor speed for a lower throughput capacity since average residence time of dough would then remain the same. Thus for any given throughput rate there is an optimum chamber size for a desired texture requirement.

The development of dough of a given formulation according to my invention has been found to be a function of energy input, i.e. the amount of energy used to develop dough at varying rotor speeds is essentially constant. However, the grain and texture of the bread appears to be a function of gas bubble subdivision. The degree of bubble subdivisoin is greatly affected by the rotor speed, so that if a fine grain and fine texture bread is desired, higher rotor speeds must be employed, bearing in mind that the energy input limits of the particular formulation must be observed by adjusting the throughput rate or the effective size of the developing chamber; conversely a coarser bread may be obtained by lowering rotor r.p.m. and throughput.

Figure 5:
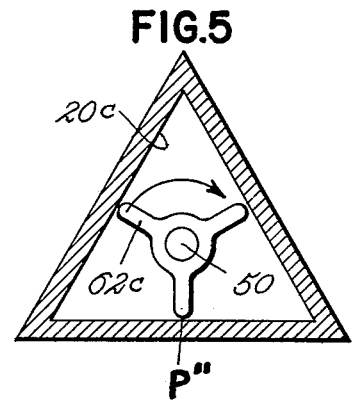
Fig. 5 is a sectional end elevation of a horizontal triangular shaped chamber, provided with a centrally mounted three-bladed paddle or rotor.
Figure 6:
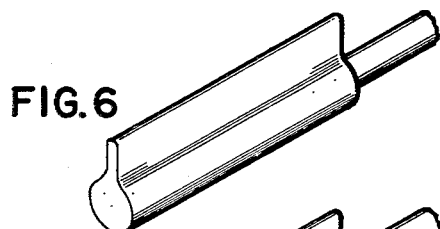
Figs. 6 to 12 are isometric views of rotors of various designs and equipped with various numbers of blades.
Figure 7:
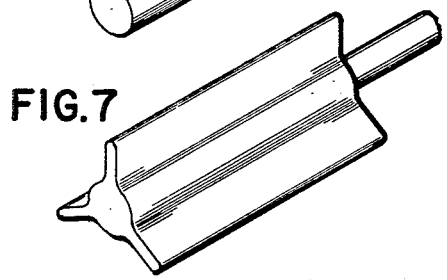
Figure 8:
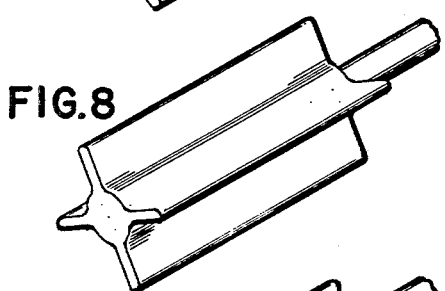
Figure 9:
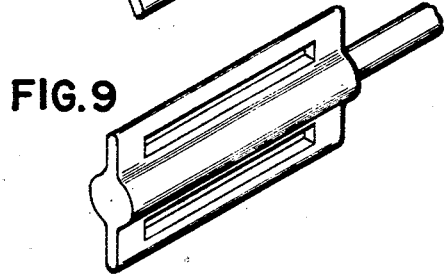
Figure 10:
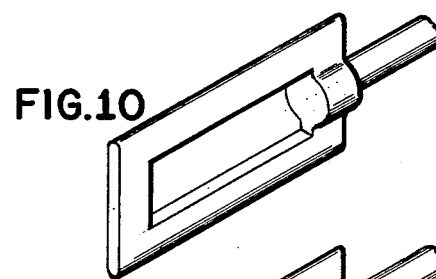
Figure 11:
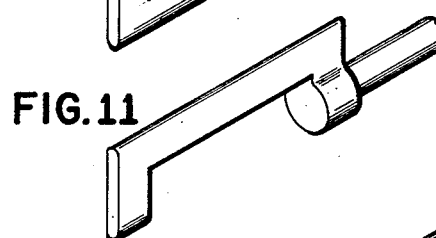
Figure 12:
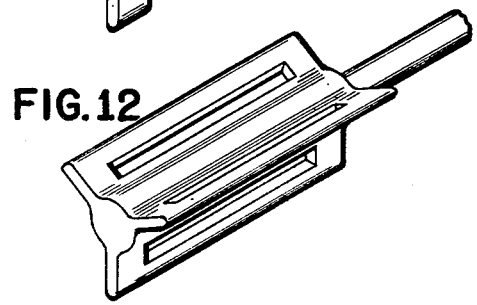

Figs. 6–12 inclusive show various types of rotors, all of which may be employed in chambers of various cross sectional shapes, some of which are illustrated in Figs. 1, 3, 4 and 5. In each instance the rotor must sweep some portion or portions of the chamber wall with very close clearance and then swing away from the wall. For example, in Fig. 1 the radius of the rotor should be as close as possible to half the minor axis of the elliptical chamber. In Figs. 4 and 5, the radius of the rotor should be as close as possible to the radius of the inscribed circle of the polygonal chamber. In Fig. 3, the rotor is mounted eccentrically to the circular chamber providing the same toward and away from the wall motion. For want of a better term, I shall hereinafter refer to this motion here as "eccentric" and the condition as "eccentricity" since its motion with respect to the walls of the chamber is "eccentric" in one sense even though the rotor may in fact be concentrically mounted as in Figs. 1, 4 and 5.

It is my discovery and an important part of my invention that a rotor thus mounted "eccentrically" and rotated in a closed chamber filled with a pre-mix of dough ingredients will develop the dough so rapidly that the apparatus may be continuously charged with the pre-mix and developed dough continuously discharged.

I do not fully understand the physical and chemical processes operating in my device.

However, it is known that the development of dough is more than a mere physical mixing operation. Certain specific mechanical action or actions is required to develop the gluten matrix to the proper degree. The precise nature of the specific mechanical operation necessary for developing dough has never been understood by those skilled in the art. Some scientists have maintained that a complex push-pull, fold-refold action was necessary; others that a kneading or rubbing action was required.

It is my theory, however, that a tensile or stretching action on the dough is sufficient to develop dough fully and efficiently if this action is carried out under the proper conditions. It is believed that the protein molecule exists in nature in a coiled form. The protein, gluten, is responsible for the ability of wheat flour to "develop" or form a matrix which permits the formation of a leavened dough. In order to form this gluten matrix, the coiled gluten molecules must be extended so that cross-linking can occur between adjacent gluten chains. Hence, the application of predominantly tensile stress should be sufficient to extend the coiled gluten molecules to permit subsequent cross-linking. The magnitude of the tensile stress must be sufficient to overcome the tendency of the extended gluten chains to re-coil before cross-linking can occur. It is my theory that the greater the magnitude of the applied tensile stress, the less is the re-coil recovery of the extended gluten chain and the more rapid is the formation of the desired gluten matrix. A concomitant effect of high tensile stress on dough is rapid shearing of the dough.

I have found that two of the most important factors in a preferred structure are (1) a high degree of "eccentricity" and (2) at least one point of very small clearance between the rotor and mixing chamber wall. By degree of "eccentricity" I mean the ratio of the maximum clearance between the rotor and mixing chamber wall to the diameter of the rotor. For example, one developer which I constructed of the elliptical type shown in Fig. 1 had a rotor of 9" diameter and a major axis of 13". Its degree of eccentricity is $$\frac{13-9}{2} : 9 = 0.22$$

For an offset cylindrical mixer such as shown in Fig. 3, having a rotor diameter of 9" and cylindrical diameter of 13", the degree of eccentricity would be 4/9 or 0.44. If the rotor in Fig. 3 were moved 1" downward, then for the same dimension of cylinder and rotor the degree of eccentricity would be 3/9 or 0.33.

I have constructed and operated developers having a degree of eccentricity varying between 0.10 and 0.50. All developed dough successfully but for each type of developer, i.e. elliptical or circular, there is an optimum degree of eccentricity. I have found that for an elliptical developer the optimum degree of eccentricity lies between 0.26 and 0.30; but a circular developer, between 0.30 and 0.40. Higher degrees of eccentricity will develop dough effectively but stagnation of the dough in the maximum clearance area leads to non-uniformity.

Close clearance between the edge of the rotor blade and wall at, at least, one point is preferred to obtain maximum rapidity and power efficiency of dough development. It is also an important factor in securing fine bubble subdivision to produce bread of fine grain and texture. In a preferred embodiment of my invention, where the clearance was substantially zero (less than 1/32" for 13" rotor as in Fig. 1), bread of exceedingly fine grain and texture was produced on a commercial scale. This bread was regarded by many observers to be superior to ordinary commercial brands in crumb appearance and eatability.

Holding the rotor speed and power intput per lb. of dough at constant levels, better results were obtained with the closer tolerance. It also appeared that the efficiency was greater as the clearance approached zero.

The following table summarizes the effect of minimum clearance on the development of dough, bread texture and grain scores in a laboratory batch type pilot model having a rotor diameter of about 2¼ inches:

| Closest Clearance, inches | Development Time, minutes | Grain Score [1] | Texture Score [1] |
| --- | --- | --- | --- |
| essentially zero | 2.5 | 7.8 | 14.5 |
| 0.125 | 3.0 | 6.3 | 13.5 |
| 0.1875 | 5.0 | 5.5 | 13.0 |

[1] In accordance with scale used by the Quality Bakers of America laboratory.

It is thus evident that lower clearance gives both a faster development time and a higher quality score. As indicated by the foregoing table, the spacing between the paddle or other dough working element and the chamber wall at the point of closest clearance should not exceed about 0.2 inch if development of the dough is to be accomplished in times on the order of 5 minutes or less.

Regarding the disposition of the point of minimum clearance between the dough working element and the chamber wall, it will be noted that the surface of revolution described by the outer edges of the blades of paddle 62, and a smooth and uninterrupted portion of the internal wall of the chamber (as wall portion A, Fig. 1) converge to the point of minimum clearance and then diverge, in the direction of rotation of the paddle. Considering that each of the blades 61 has a tip constituting a radially disposed imperforate working portion, it is apparent that, as the paddle is rotated, such working portion moves from a position of maximum spacing from the chamber wall, such maximum spacing being large as compared to 0.2 inch, to a position of minimum spacing with respect to wall portion A and then away from wall portion A. Each such movement not only causes a pumping of the dough mix but also causes an increment of the dough mix to be compressed into a thin layer between the outer edge of the paddle and wall portion A.

The radially disposed working portion of the paddle has been referred to as imperforate since, in order that a pumping of the dough be accomplished during rotation of the paddle, said working portion must present a leading face capable of moving dough mix. It is to be understood, however, that the radial extent of such working portion can be limited. Accordingly, the blades of the paddles illustrated in Figs. 9–12, for example, all provide such a radially disposed imperforate working portion.

While the dough mix is compressed as the tips of the paddle approach wall portions A, the greater spacing between the tips of the paddle and the chamber wall, as the tips swing into their positions of maximum spacing, is such as to allow a freer relative movement between the tips of the paddle and the dough mix.

My invention is designed for adaptation to continuous mixing; but it is not so limited. It can and has been used "batch wise." A structure similar to Fig. 1 of the drawings may be used batchwise by modifying it to permit easily loading of the ingredients and removal of the developed dough.

I claim:

1. A machine adapted to develop dough on a continuous basis comprising, an elongated cylindrical member, an elliptical cylinder positioned in said cylindrical member, said elliptical cylinder having an outside major axis substantially equal to the internal diameter of said cylindrical member, end plates secured to the ends of said elliptical cylinder, said end plates being further secured to said cylindrical member to define a closed chamber, said cylindrical member, said elliptical cylinder and said end plates thereby forming at least one elliptical chamber and two lateral lunar chambers, a rotor longitudinally and centrally mounted in said formed elliptical chamber for rotation, said rotor comprising a shaft and at least one paddle disposed in a radial plane, the radius of said rotor being substantially equal to half the internal minor axis of said elliptical chamber, means to rotate said rotor, at least one transverse baffle plate mounted in said elliptical chamber in the region unswept by said rotor during its rotation, continuous feed means into said elliptical chamber to feed a crude premix of the ingredients of dough, continuous discharge means from said elliptical chamber to discharge developed dough, and means to supply and withdraw a fluid coolant from and to each of said lunar chambers.

2. In a high speed dough developer, the combination of means defining a closed and sealed chamber having inlet means via which a dough mix can be supplied to completely fill said chamber, a dough working element mounted within said chamber for rotation about an axis extending within said chamber, said dough working element having at least one radially disposed imperforate working portion, the interior of said chamber including at least one smooth and uninterrupted wall portion to which the remainder of the internal wall of said chamber is joined, said internal wall being free from internal projections in the area of said wall portion, said wall portion extending generally axially of said dough working element adjacent the surface of revolution described by a tip of said working portion as said dough working element is rotated about said axis, said surface of revolution and said wall portion converging and then diverging in the direction of rotation of said dough working element and said working portion therefore moving from a position of maximum spacing from the internal wall of said chamber to a position of minimum spacing from said wall portion and then away from said wall portion, the space between said wall portion and said working portion when the latter is in said position of minimum spacing being substantially constant along the axis of said dough working element and not exceeding 0.2 inch, whereby when said chamber is filled with dough mix successive increments of the dough mix are each compressed into a thin layer between said working portion and said wall portion as said dough working element is rotated about said axis, the space between said working portion and the chamber wall when said working portion approaches said position of maximum spacing permitting relatively free relative movement between the dough mix and the tip of said working portion; and drive means connected to said dough working element to rotate the same about said axis when said chamber is filled with dough mix, said dough working element coacting with said wall portion, when said dough working element is so rotated with said chamber filled with dough mix, to develop the entire quantity of dough mix in said chamber within a time interval in the range of from less than a minute to about 5 minutes.

3. A dough developer in accordance with claim 2 and wherein said chamber has an oblong cross-section transverse to said axis and said dough working element is an elongated paddle, said axis being centered with respect to a minor axis of said oblong cross-section, said paddle being symmetrical with respect to its axis of rotation.

4. A dough developer in accordance with claim 2 and wherein said chamber has a circular cross-section transverse to said axis and said axis is eccentric with respect to the central axis of said circular transverse cross-section.

5. A dough developer in accordance with claim 2 and wherein said chamber has a polygonal cross-section transverse to said axis, a flat portion of the internal wall of of said chamber including said uninterrupted wall portion.

6. A dough developer in accordance with claim 2 and wherein said chamber has a polygonal cross-section transverse to said axis and said dough working element is a multi-bladed paddle, the number of blades of said paddle being equal to the number of sides of the polygon of said cross-section, the axis of rotation of said paddle being centered relative to the polygon of said cross-section and said blades being of equal radial extent.

7. A dough developer in accordance with claim 2 and wherein said dough working element is a paddle and the tip of said working portion includes a transversely rounded radially disposed edge on the blade of said paddle.

8. A dough developer in accordance with claim 2 and wherein said chamber has an elliptical cross-section transverse to said axis of rotation, said dough working element is a paddle, said axis of rotation is centered with respect to the minor axis of said elliptical cross-section, said paddle is symmetrical with respect to said axis of rotation, and the ratio of the maximum clearance between the tips of said paddle and the internal wall of the chamber to the diametrical dimension of said paddle being from about 0.26 to about 0.30.

9. A dough developer in accordance with claim 2 and wherein said chamber has a circular cross-section, said dough working element is a paddle, said axis of rotation is displaced from the center of said circular cross-section, said paddle is symmetrical with respect to said axis of rotation, the ratio of the maximum clearance between the tips of said paddle and the internal wall of said chamber to the diametrical dimension of said paddle being from about 0.3 to about 0.4.

10. A dough developer in accordance with claim 2 wherein said chamber is elongated in the direction of said axis of rotation and said axis of rotation extends horizontally.

11. In a high speed dough developer, the combination of means defining an elongated chamber, inlet means connected at one end of said chamber and via which a dough mix can be supplied continuously under pressure to completely fill said chamber and maintain the dough mix in said chamber under a pressure greater than atmospheric, outlet means connected at the other end of said chamber and via which completed dough can be withdrawn from said chamber, said chamber being closed and sealed save for said inlet means and outlet means, a dough working element mounted within said chamber for rotation about an axis extending longitudinally of said chamber, said dough working element having at least one radially disposed imperforate working portion, the interior of said chamber including at least one smooth and uninterrupted wall portion to which the remainder of the internal wall of said chamber is joined, said internal wall being free from internal projections in the area of said wall portion, said wall portion extending generally axially of said dough working element adjacent the surface of revolution described by a tip of said working portion as said dough working element is rotated about said axis, said surface of revolution and said wall portion converging and then diverging in the direction of rotation of said dough working element and said working portion therefore moving from a position of maximum spacing from the internal wall of said chamber to a position of minimum spacing from said wall portion and then away from said wall portion, the space between said wall portion and said working portion when the latter is in said position of minimum spacing being substantially constant along the axis of said dough working element and not exceeding 0.2 inch, whereby when said chamber is filled with dough mix successive increments of the dough mix are each compressed into a thin layer between said working portion and said wall portion as said dough working element is rotated about said axis, the space between said working portion and the chamber wall when said working portion approaches said position of maximum spacing permitting relatively free relative movement between the dough mix and the tip of said working portion; and drive means connected to said dough working element to rotate the same about said axis when said chamber is filled with dough mix, continuous supply of dough mix via said inlet means being effective to cause the dough mix to advance in said chamber toward said outlet means, said dough working element coacting with said wall portion, when said dough working element is so rotated with said chamber filled with dough mix, to develop the entire quantity of dough mix in said chamber within a time interval in the range of from less than a minute to about 5 minutes.

12. A dough developer in accordance with claim 11 and wherein said chamber has an oblong cross-section transverse to said axis and said dough working element is an elongated paddle, said axis being centered with respect to a minor axis of said oblong cross-section, said paddle being symmetrical with respect to its axis of rotation.

13. A dough developer in accordance with claim 11 and wherein said chamber has a circular cross-section transverse to said axis and said axis is eccentric with respect to the central axis of said circular transverse cross-section.

14. A dough developer in accordance with claim 11 and wherein said chamber has a polygonal cross-section transverse to said axis, a flat portion of the internal wall of said chamber including said uninterrupted wall portion.

15. A dough developer in accordance with claim 11 and wherein said dough working element is a paddle and the tip of said working portion includes a transversely rounded radially disposed edge on the blade of said paddle.

16. A dough developer in accordance with claim 11 and wherein said chamber has an elliptical cross-section transverse to said axis of rotation, said dough working element is a paddle, said axis of rotation is centered with respect to the minor axis of said elliptical cross-section, said paddle is symmetrical with respect to said axis of rotation, and the ratio of the maximum clearance between the tips of said paddle and the internal wall of the chamber to the diametrical dimension of said paddle being from about 0.26 to about 0.30.

17. A dough developer in accordance with claim 11 and wherein said chamber has a circular cross-section, said dough working element is a paddle, said axis of rotation is displaced from the center of said circular cross-section, said paddle is symmetrical with respect to said axis of rotation, the ratio of the maximum clearance between the tips of said paddle and the internal wall of said chamber to the diametrical dimension of said paddle being from about 0.3 to about 0.4.

18. A dough developer in accordance with claim 11 and wherein said chamber is disposed with its long dimension extending horizontally.

References Cited in the file of this patent

UNITED STATES PATENTS

| | | |
|---|---|---|
| Re. 1,524 | Fitzgerald | Aug. 18, 1863 |
| 332,018 | Smith | Dec. 8, 1885 |
| 640,097 | Corby et al. | Dec. 26, 1889 |
| 852,497 | Chambers | May 7, 1907 |
| 1,372,172 | Larsen | Mar. 22, 1921 |
| 1,510,165 | Temple | Sept. 30, 1924 |
| 1,535,204 | Darrah | Apr. 28, 1925 |
| 1,680,948 | Lauterbur et al. | Aug. 14, 1928 |
| 1,700,510 | Oches | Jan. 29, 1929 |
| 2,084,773 | Mason et al. | June 22, 1937 |
| 2,112,927 | Pierre | Apr. 5, 1938 |
| 2,148,178 | Shropshire | Feb. 21, 1939 |
| 2,181,079 | Dehuff | Nov. 21, 1939 |
| 2,184,225 | McDuffee et al. | Dec. 19, 1939 |

FOREIGN PATENTS

| | | |
|---|---|---|
| 735,184 | Great Britain | Aug. 17, 1955 |